US008033502B2

(12) United States Patent
de Siqueira

(10) Patent No.: US 8,033,502 B2
(45) Date of Patent: Oct. 11, 2011

(54) MODULAR AIRCRAFT INTERIOR CONFIGURATION AND METHODS

(75) Inventor: Fernando Antonio Ponzo de Siqueira, São Jose cos Campos (BR)

(73) Assignee: Embraer—Empresa Brasileira De Aeronautica S.A., Sao Jose Dos Campos-SP (BR)

( * ) Notice: Subject to any disclaimer, the term of this patent is extended or adjusted under 35 U.S.C. 154(b) by 782 days.

(21) Appl. No.: 11/972,323

(22) Filed: Jan. 10, 2008

(65) Prior Publication Data

US 2008/0179458 A1 Jul. 31, 2008

Related U.S. Application Data

(60) Provisional application No. 60/897,493, filed on Jan. 26, 2007.

(51) Int. Cl.
B64D 13/06 (2006.01)

(52) U.S. Cl. .............. 244/118.6; 244/117 R; 244/119; 244/118.1

(58) Field of Classification Search .............. 244/118.6, 244/118.5, 122 R, 119, 120, 117 R, 118.1; 105/344–347; 296/64; 297/232, 239, 243, 297/244, 245, 248; 248/503.1
See application file for complete search history.

(56) References Cited

U.S. PATENT DOCUMENTS

| | | | | |
|---|---|---|---|---|
| 2,382,402 A * | 8/1945 | De Roode | .................. | 244/118.6 |
| 2,396,039 A | 3/1946 | Burton et al. | | |
| 3,652,050 A * | 3/1972 | Marrujo et al. | .................. | 248/429 |
| 3,893,729 A * | 7/1975 | Sherman et al. | .............. | 297/118 |
| 4,479,621 A * | 10/1984 | Bergholz | .................. | 244/117 R |
| 4,483,499 A * | 11/1984 | Fronk | ......................... | 244/118.1 |
| 5,024,398 A | 6/1991 | Riedinger et al. | | |
| 5,083,727 A | 1/1992 | Pompei et al. | | |
| 5,178,345 A * | 1/1993 | Peltola et al. | .............. | 244/118.6 |
| 5,597,139 A * | 1/1997 | Beroth | ....................... | 244/118.6 |
| 5,727,845 A * | 3/1998 | Jackson-Wynch | ........... | 297/257 |
| 5,775,642 A * | 7/1998 | Beroth | ....................... | 244/118.6 |
| 5,921,629 A * | 7/1999 | Koch et al. | ................. | 297/344.1 |
| 6,000,659 A * | 12/1999 | Brauer | ....................... | 244/118.6 |
| 6,739,281 B1 | 5/2004 | Grimes | | |
| 7,195,201 B2 * | 3/2007 | Grether et al. | ............. | 244/118.1 |
| 2004/0195451 A1* | 10/2004 | Bentley et al. | ............. | 244/118.6 |
| 2005/0001097 A1 | 1/2005 | Saint-Jalmes | | |
| 2005/0023413 A1* | 2/2005 | Saint-Jalmes | .............. | 244/118.6 |
| 2005/0103935 A1 | 5/2005 | Sprenger et al. | | |
| 2007/0034742 A1* | 2/2007 | Jaeger et al. | ............... | 244/118.6 |
| 2007/0080258 A1 | 4/2007 | Baatz et al. | | |

FOREIGN PATENT DOCUMENTS

WO WO 2004/069657 A1 8/2004

OTHER PUBLICATIONS http://dictionary.reference.com/browse/sofa.*

* cited by examiner

*Primary Examiner* — Joshua Michener
(74) *Attorney, Agent, or Firm* — Nixon & Vanderhye P.C.

(57) ABSTRACT

Modular configuration for an aircraft interior floor plan design is provided by an fuselage having starboard and port side attachment rails disposed longitudinally parallel to one another. Each of the starboard and port side attachment rails are comprised of outboard and inboard rails and a center rail positioned therebetween. A plurality of interior fixtures are provided with fixed attachment posts asymmetrically oriented relative to a longitudinal centerline plane of the fixture. Such fixtures can therefore be attached to predetermined pairs of the starboard and port side attachment rails to provide for a desired configuration of the fixtures within the fuselage.

10 Claims, 9 Drawing Sheets

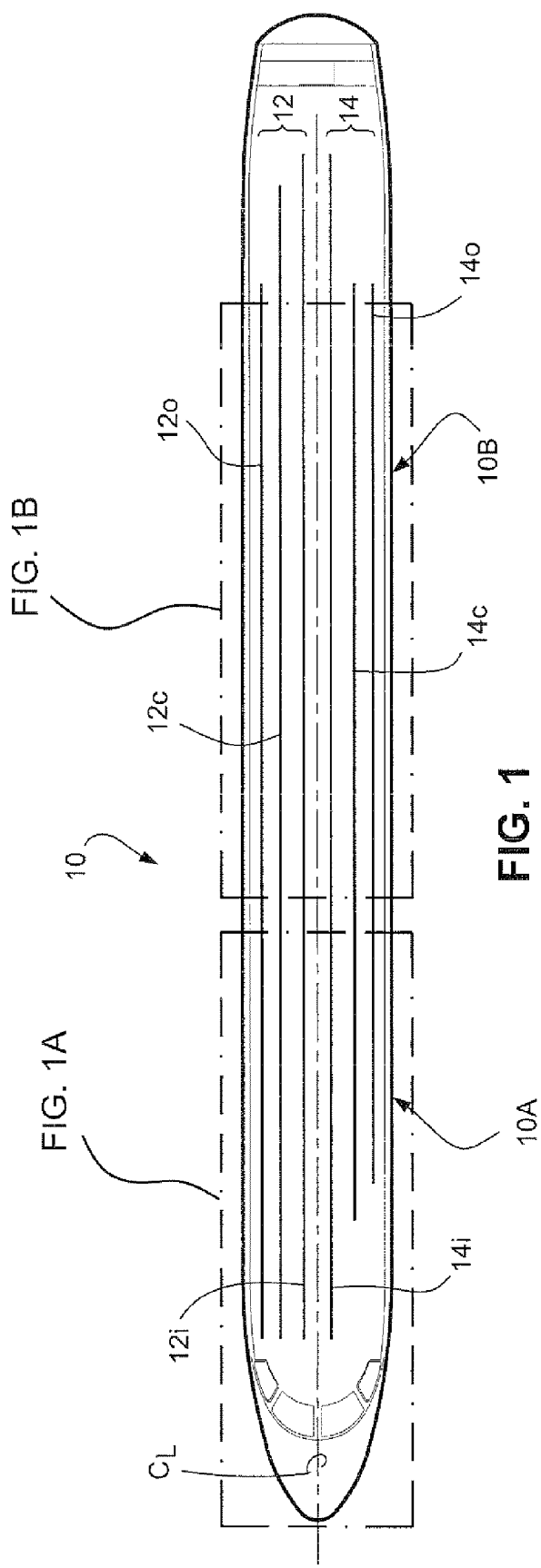

MODULAR AIRCRAFT INTERIOR CONFIGURATION AND METHODS

CROSS-REFERENCE TO RELATED APPLICATION

This application is related to and claims domestic priority benefits under 35 USC §119(e) from U.S. Provisional Application Ser. No. 60/897,493 filed on Jan. 26, 2007, the entire content of which is expressly incorporated hereinto by reference.

FIELD OF THE INVENTION

This invention relates generally to aircraft and, more specifically, to passenger aircraft interior configurations and methods. In especially preferred embodiments, the present invention relates to aircraft interior fixtures (e.g., single and dual passenger seat assemblies, tables, sofas and the like) which may be positioned within the aircraft interior at various locations to achieve desired interior configurations.

BACKGROUND AND SUMMARY OF THE INVENTION

Passenger interior floor plans conventionally allow a limited degree of customization if little structural rework is desired. Usually aircraft interior fixtures can be installed for smaller executive jets on areas defined exclusively for monuments and seat assemblies can be installed on areas defined for seat assemblies. If an area is defined to accommodate a wardrobe, for example, only a wardrobe or a similar monument can be installed in the same area.

Larger executive jets typically allow more customized configurations, but structural rework is required in order to provide the necessary attachment points. Modules, in this case, are not clearly defined as monument and/or seat arrangements designed to be installed in a marked zone of the aircraft. Especially in the Executive Jets market, the possibility of floor plan customization is a very important requirement for the customer. A modular interior configuration greatly improves the possibility of customization since different aircraft interior fixtures can be arranged on the same position inside a defined zone.

Flexible interior fixture placement within an aircraft becomes problematic for aircraft having symmetrically arranged pairs of longitudinal attachment tracks, wherein the tracks are separated by unequal dimensions. This particular arrangement of seat tracks has in the past necessitated dedicated seat assemblies and/or monuments for dedicated rail pairs in order to achieve a desired interior configuration.

It would therefore be desirable if aircraft interior fixture arrangement could be provided having greater universal orientation capabilities which in turn could provide for greater flexibility of fixture placements within the aircraft interior to achieve different configurations. It is towards fulfilling such needs that the present invention is directed.

Broadly, embodiments of the present invention generally provide for a modular configuration for the aircraft interior floor plan design. The modular configuration allows a higher level of interior customization for the owner, who can choose between a number of pre-defined aircraft interior fixture arrangements inside a limited zone of the aircraft. These zones have structural provisions that allow the installation of the different interior fixtures on different positions inside the aircraft fuselage.

In especially preferred embodiments of the invention, aircraft are provided comprising a fuselage having starboard and port side attachment rails disposed longitudinally parallel to one another. Each of the starboard and port side attachment rails may be comprised of outboard and inboard rails and a center rail positioned therebetween. A plurality of interior fixtures may be provided with fixed attachment posts asymmetrically oriented relative to a longitudinal centerline plane of the fixture. Such fixtures can therefore be attached to predetermined pairs of the starboard and port side attachment rails to provide for a desired configuration of the fixtures within the fuselage.

The fixtures may include at least one selected from the group consisting of single passenger seat assemblies, dual passenger seat assemblies, table assemblies and sofa assemblies. In some embodiments, the fixtures will include at least one fixture selected from the group consisting of single seat assemblies, dual seat assemblies and sofa assemblies, wherein each of the single seat assemblies, dual seat assemblies and sofa assemblies have fixed attachment posts which are asymmetrically off-set in an outboard direction relative to longitudinal centerline planes thereof.

In other embodiments, the fixtures will include at least one of single and dual seat assemblies and at least one of single and dual seat table assemblies positioned symmetrically in front of a respective one of the single and dual seat assemblies, wherein each of the single and dual seat table assemblies have fixed attachment posts which are asymmetrically off-set in an inboard direction relative to centerline planes thereof to allow symmetrical positioning in front of the single and dual seat assemblies, respectively.

The fixtures may also include a sofa assembly. In those embodiments having a sofa assembly, it will preferably be provided with fixed attachment posts which are asymmetrically off-set in an outboard direction relative to a longitudinal centerline plane thereof.

Each of the outboard and center rails of the starboard and port rails is preferably separated by a dimension Do, and wherein the each of the inboard and center rails of the starboard and port rails is separated by a dimension Di which is greater dimension Do. In addition, it is preferred that each of the inboard rails of the starboard and port rails is separated by a dimension Dc which is greater than Di. Thus in some embodiments, Dc>Di>Do.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein;

FIG. 1 is a top plan x-ray view of an aircraft fuselage which embodies configurable interior fixtures in accordance with the present invention;

DETAILED DESCRIPTION OF THE INVENTION

As used herein and in the accompanying claims, various terms of orientation are used in relation to an aircraft and have the following definitions. The terms "forward" and "aft" directionally mean towards the forward and aft portions, respectively, of an aircraft's fuselage as viewed in a forward facing position. Similarly, "starboard" and "port" directionally mean the right and left sides, respectively, of an aircraft as viewed in a forward facing position relative to the fuselage centerline of the aircraft. The terms "inboard" and "outboard" mean a direction toward and away from, respectively, the fuselage centerline of the aircraft. The term "longitudinal centerline plane" when referring to an aircraft interior fixture means a plane which bisects the aircraft fixture longitudinally parallel to the longitudinal centerline plane of the aircraft fuselage.

Figure 1A:
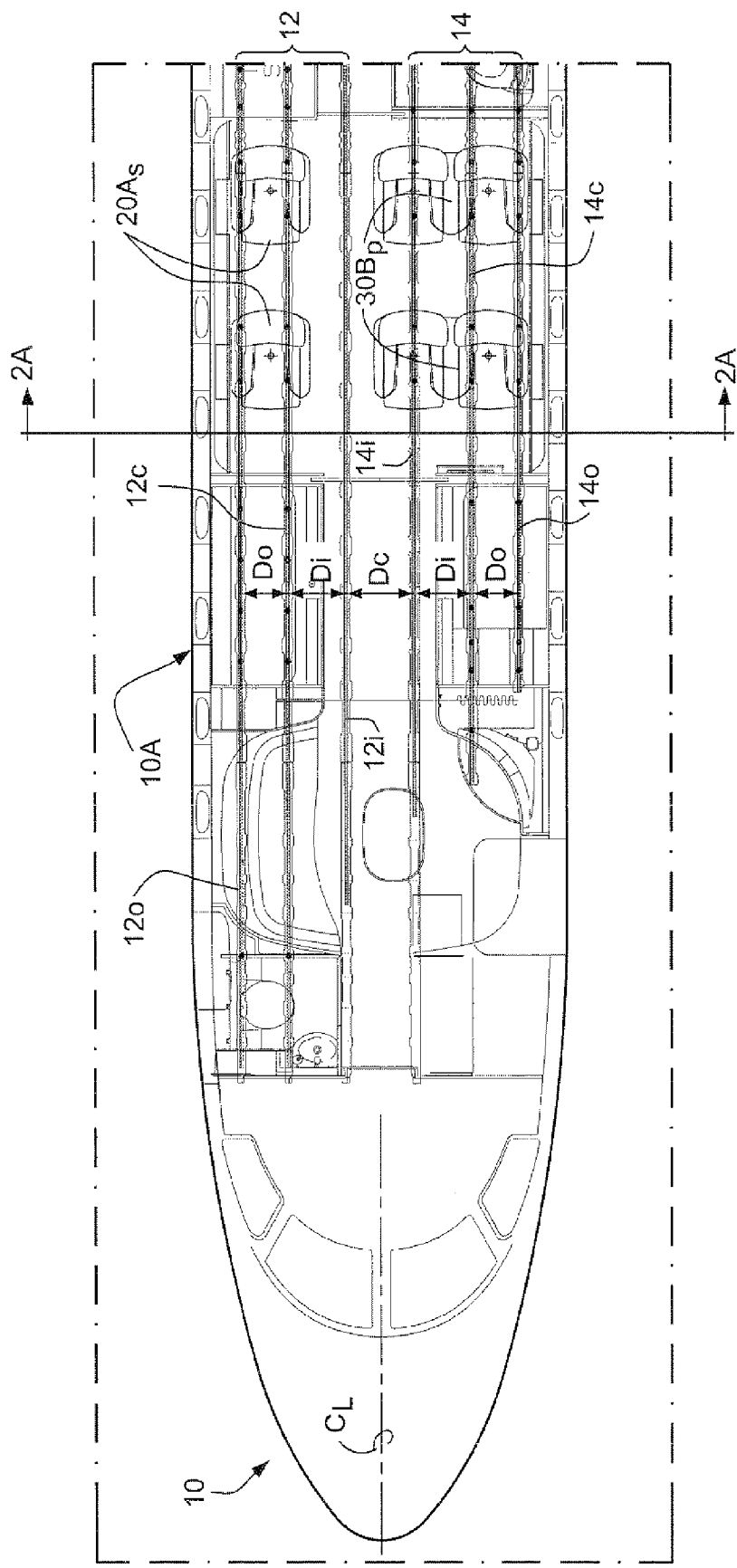
FIGS. 1A and 1B are enlarged top plan x-ray views of the forward and aft sections of the aircraft fuselage depicted in FIG. 1 showing one possible interior configuration of fixtures therein.
Figure 1B:
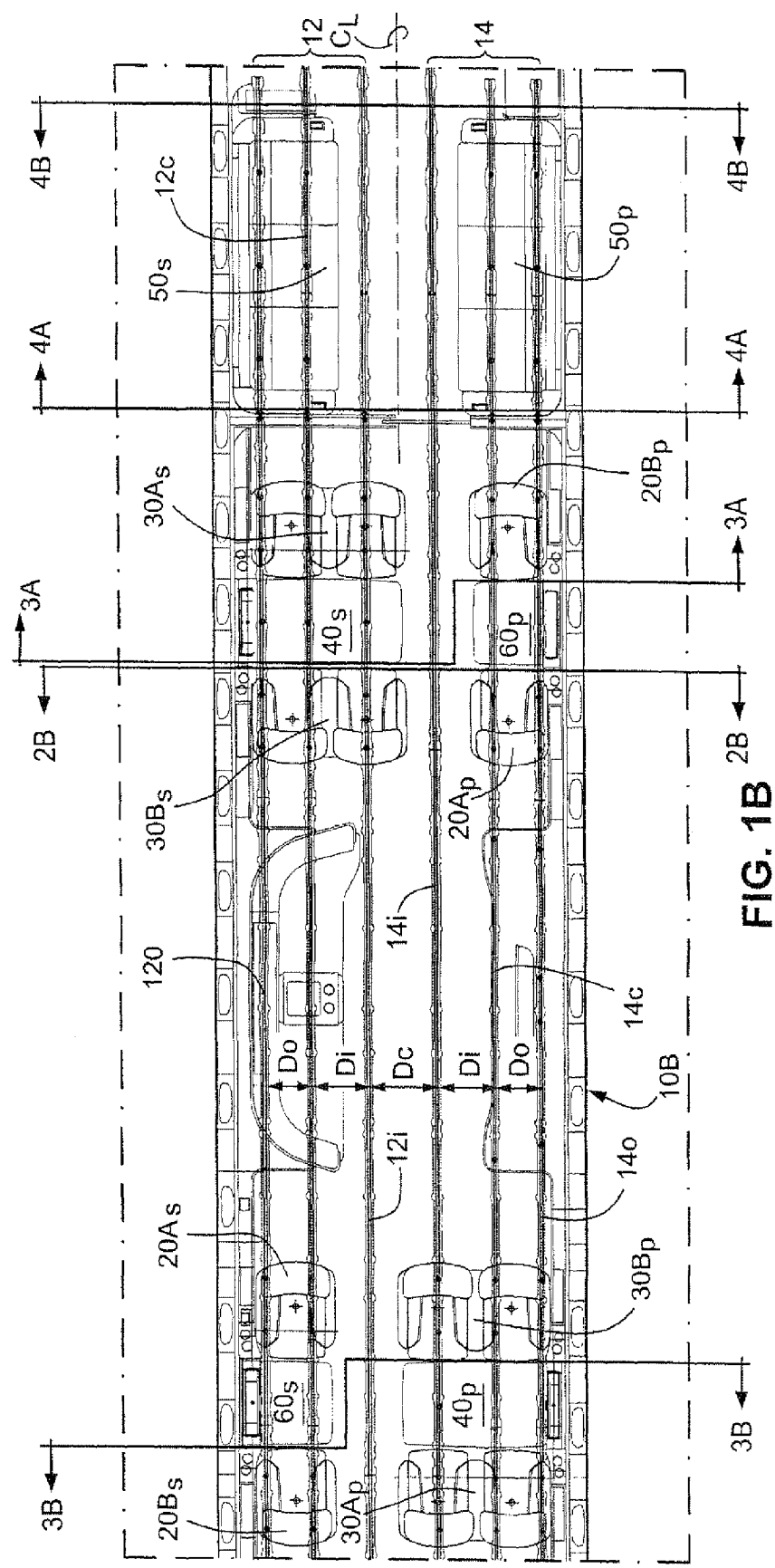

Accompanying FIGS. 1A and 1B represent forward and aft fuselage sections 10A, 10B of an aircraft 10 showing a possible interior configuration therein, respectively. It will be understood that the interior configuration depicted in FIGS. 1A and 1B is exemplary only and is not limiting to the present invention. Thus, as will be understood from the discussion which follows, a variety of different interior configurations will be possible limited only perhaps by the imagination of the personnel designing a particular layout.

The aircraft 10 is provided with starboard and port side track pairs 12,14, respectively, running substantially the lengthwise extent of the fuselage sections 10A and 10B parallel to the centerline $C_L$ of the aircraft 10. Each of the track pairs is comprised of a central track 12c, 14c flanked by outboard and inboard (relative to the aircraft centerline $C_L$) tracks 12o, 14o and 12i, 14i, respectively. Thus, track pairs are formed of tracks 12o/12c, 12i/12c, 14o/14c and 14i, 14c, respectively.

The separation distances between the various track pairs, while symmetrical relative to the aircraft centerline $C_L$, is not however equal to one another. In this regard, the distances Do between the outboard starboard and port track pairs 12o/12c and 14o/14c are equal to one another but are less as compared to the distances Di between the inboard starboard and port track pairs 12i/12c and 14i/14c, respectively. In addition the center distance Dc between the inboard pair of tracks 12i/14i is greater as compared to distances Di and Do. Thus, in preferred embodiments, Dc>Di>Do.

As can also be seen from FIGS. 1A and 1B, the interior of the aircraft may be comprised of one or more forward facing starboard and port side single passenger seat assemblies $20A_s$ and $20B_p$, respectively, and one or more rearward facing port and starboard side single passenger seat assemblies $20A_p$, $20B_s$, respectively. Similarly one or more forward facing starboard and port side dual passenger seat assemblies $30A_s$ and $30B_p$, respectively, and one or more rearward facing port and starboard side dual passenger seat assemblies $30A_p$ and $30B_s$, respectively. For passenger convenience, starboard and port side dual tables $40_s$, $40_p$, starboard and port side sofas $50_s$, $50_p$ and starboard and port side single tables $60_s$, $60_p$ may be provided.

Figure 2A:
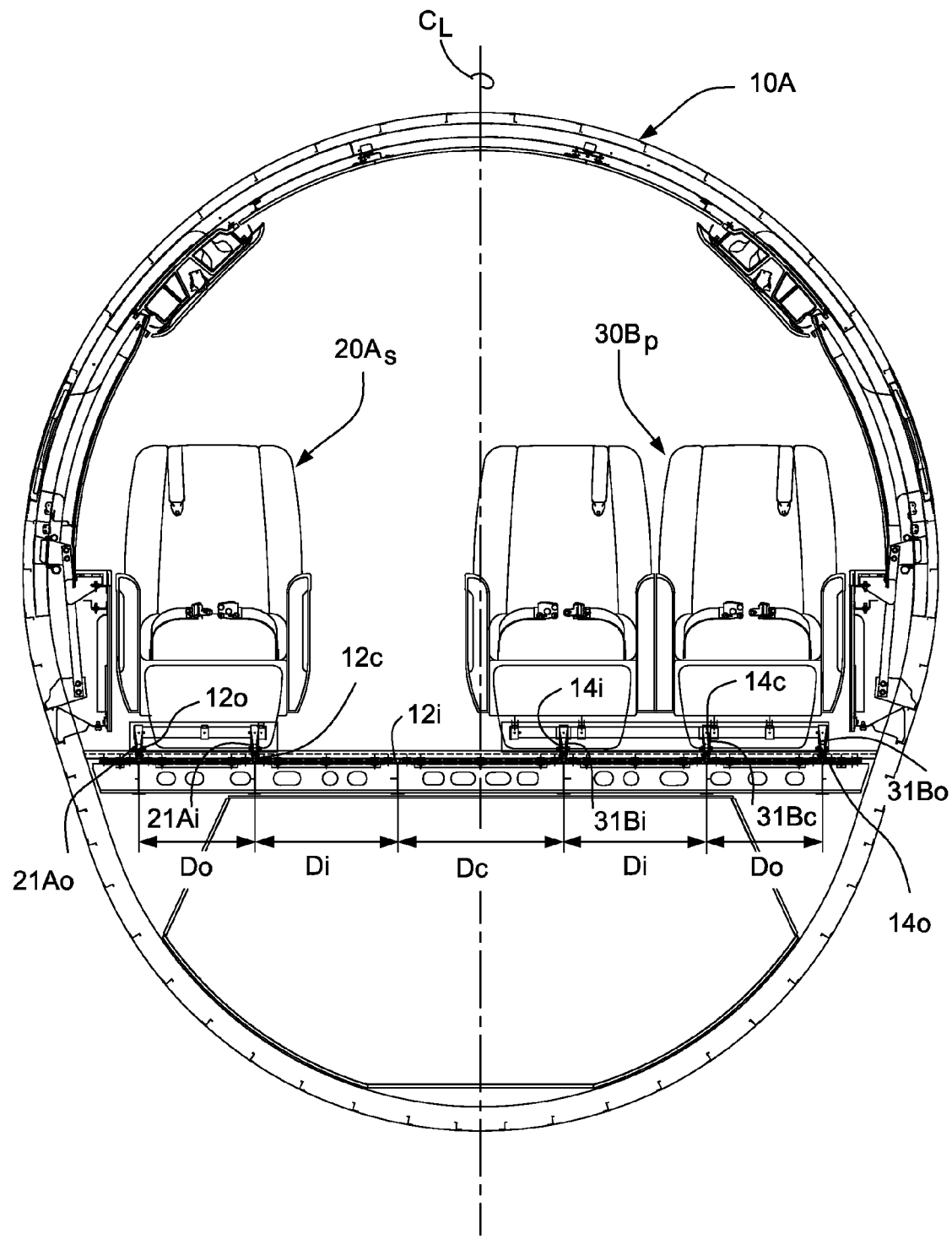
FIGS. 2A and 2B are aftward and forward looking cross-sectional elevations as taken along lines 2A-2A and 2B-2B in FIGS. 1A and 1B, respectively.
Figure 2B:
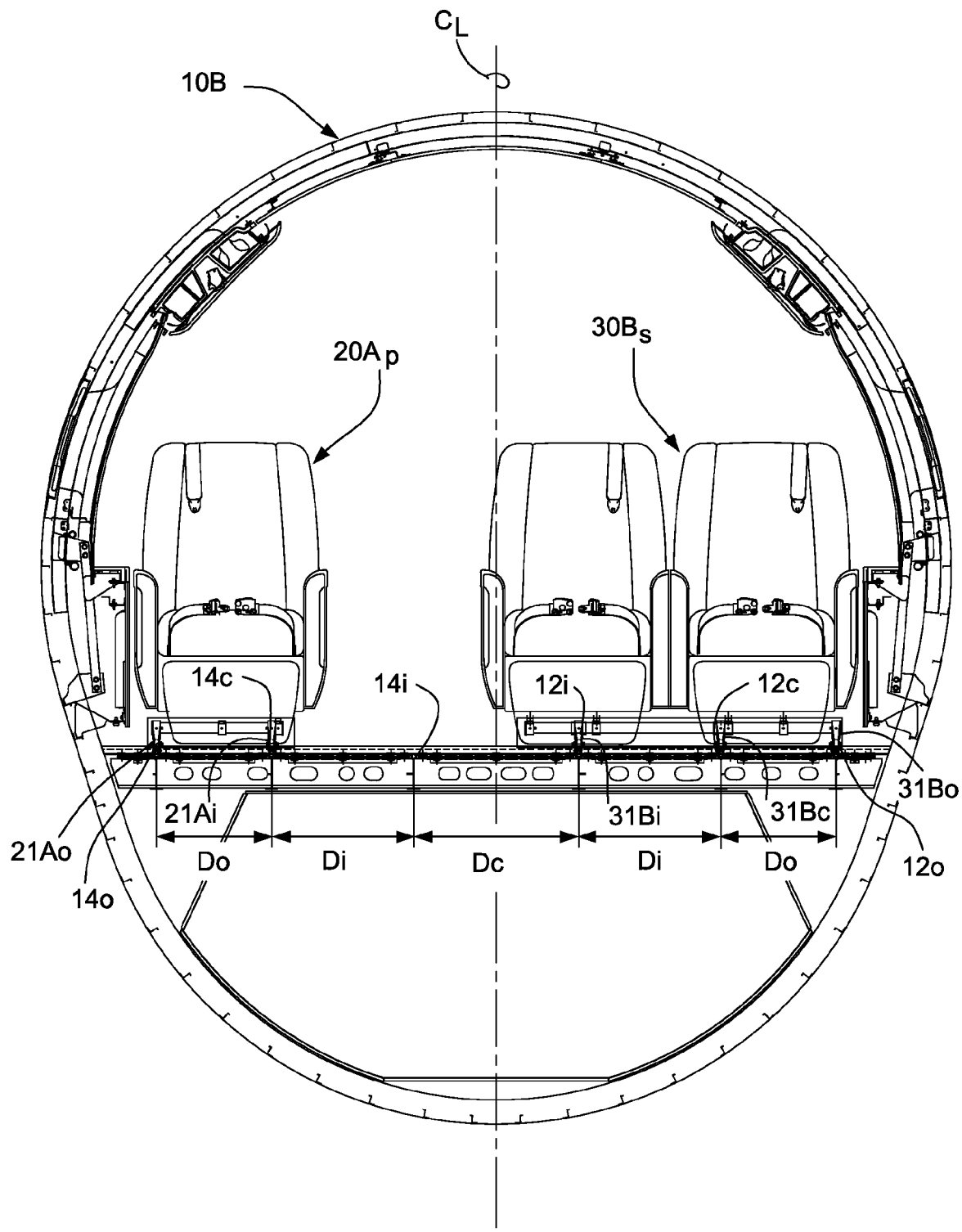

Due to the unequal spacing between the track pairs 12, 14 as discussed previously the various seat assemblies, tables and monuments may be provided with fixed attachment points so as to be positionable on the starboard and port sides of the aircraft. Thus, as shown in FIGS. 2A and 2B, the single passenger seat assemblies $20A_s$ and $20A_p$ are structurally identical to one another with respect to their respective fixed-position (i.e., non-adjustable) attachment posts $21A_i$ and $21A_o$ being separated by the same distance as Do for attachment to the track pairs 12o/12c and 14o/14c, respectively, but may be positioned mirror image to one another, i.e., in a forward facing orientation on the starboard side of the aircraft and a rearward facing orientation on the port side of the aircraft, respectively. This mirror image placement of the passenger seat assemblies $20A_s$ and $20A_p$ is permitted not only by the spacing of the attachment posts $21A_i$ and $21A_o$ so as to be separated by the distance Do, but also due to the fact that the attachment posts $21A_i$ and $21A_o$ are asymmetrically off-set relative to the longitudinal centerline planes of the seat assemblies $20A_s$ and $20A_p$ in an outboard direction. As such, the seat assemblies $20A_s$ and $20A_p$ may be positioned closely adjacent to the wall of the aircraft fuselage when fixed to the track pairs 12o/12c and 14o/14c.

In a similar manner, dual passenger seat assemblies $30B_p$ and $30B_s$ are structurally identical to one another with respect to their respective fixed-position (i.e., non-adjustable) pairs of attachment posts $31B_o$ and $31B_c$ on the one hand and attachment posts $31B_i$ and $31B_c$ on the other hand being separated by the same distances as Do and Di for attachment to the track pairs 12o/12c, 14o/14c, and 12i/12c, 14i,14c, respectively, but may be positioned mirror image to one another, i.e., in a forward facing orientation on the port side of the aircraft and a rearward facing orientation on the starboard side of the aircraft, respectively. This mirror image placement of the passenger seat assemblies $30B_p$ and $30B_s$ is permitted not only by the spacing of the attachment posts $31B_o$, $31B_c$ and $31B_i$ so as to be separated by the distances Do and Di, but also due to the fact that the attachment posts $31B_o$, $31B_c$ and $31B_i$ are asymmetrically off-set relative to the longitudinal centerline planes of the seat assemblies $30B_p$ and $30B_s$ in an outboard direction. As such, the seat assemblies $30B_p$ and $30B_s$ may be positioned closely adjacent to the wall of the aircraft fuselage when fixed to the track seat assemblies 12o, 12c and 12i or 14o, 14c and 14i.

Figure 3A:
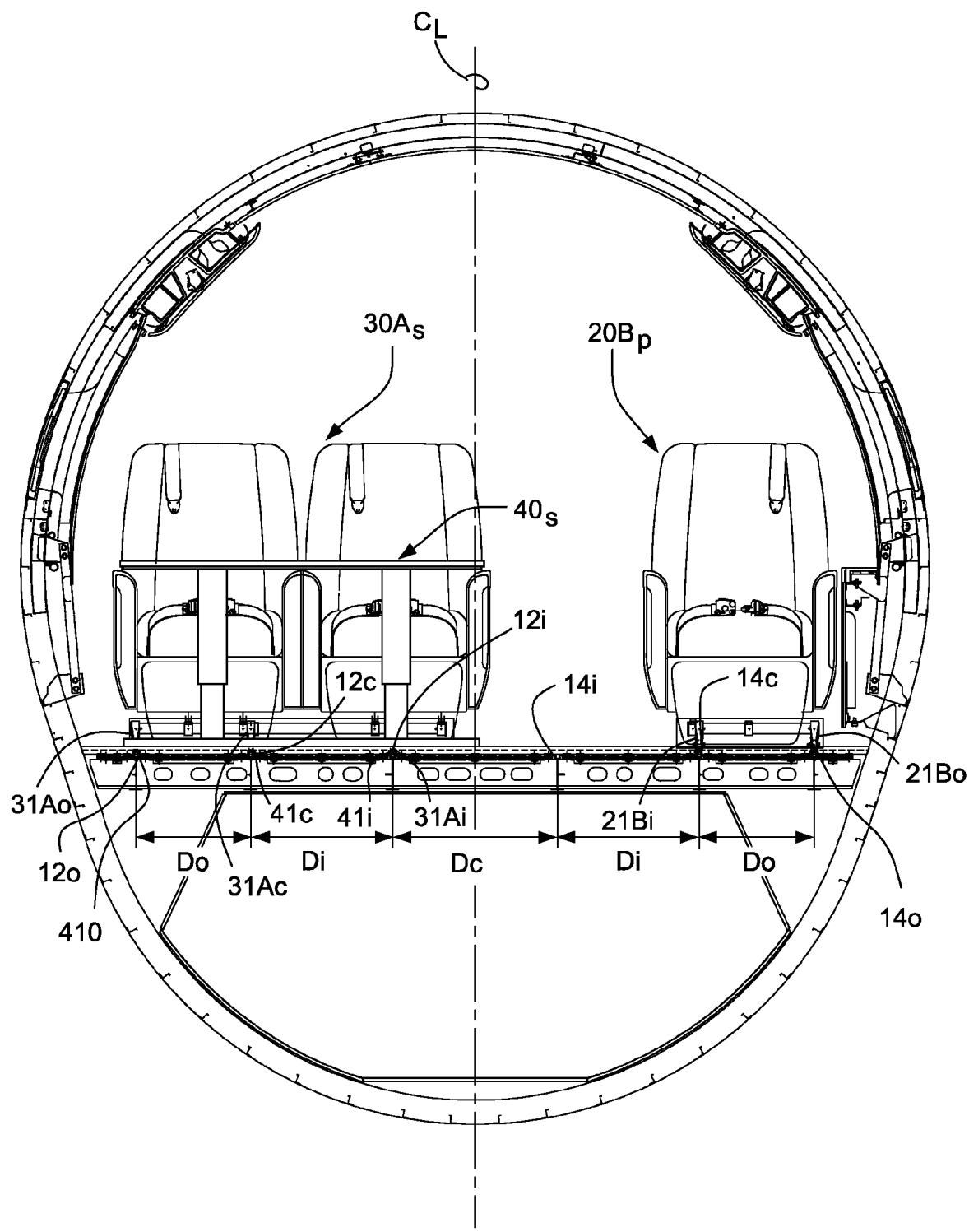
FIGS. 3A and 3B are aftward and forward looking cross-sectional elevations as taken along lines 3A-3A and 3B-3B in FIG. 1B.
Figure 3B:
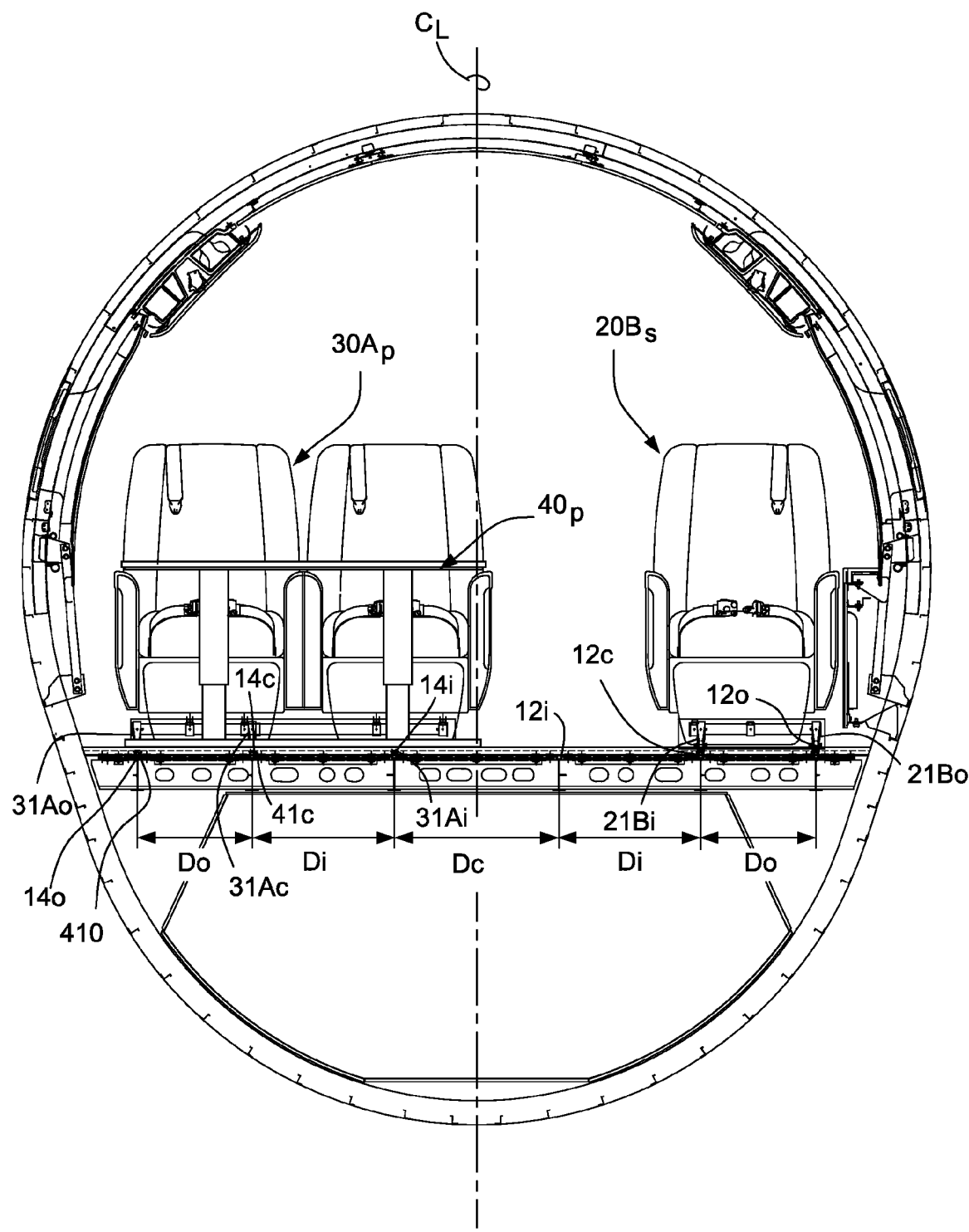

As shown in FIGS. 3A and 3B, the single passenger seat assemblies 20B$p$ and $20B_s$, are structurally identical to one another with respect to their respective fixed-position (i.e., non-adjustable) attachment posts $21B_i$, and $21B_o$ being separated by the same distance as Do for attachment to the track pairs $14_o/14_c$ and $12_o/12_c$, respectively, but may be positioned mirror image to one another, i.e., in a forward facing orientation on the port side of the aircraft and a rearward facing orientation on the starboard side of the aircraft, respectively. This mirror image placement of the passenger seat assemblies 20B$p$ and $20B_s$, is permitted not only by the spacing of the attachment posts $21B_i$, and $21B_o$ so as to be separated by the distance Do, but also due to the fact that the attachment posts $21B_i$, and $21B_o$ are asymmetrically off-set relative to the longitudinal centerline planes of the seat assemblies 20B$p$ and $20B_s$, in an outboard direction. As such, the seat assemblies 20B$p$ and $20B_s$, may be positioned closely adjacent to the wall of the aircraft fuselage when fixed to the track pairs 14o/14c and 12o/12c.

Similarly dual passenger seat assemblies $30A_s$ and $30A_p$ are structurally identical to one another with respect to their respective fixed-position (i.e., non-adjustable) pairs of attachment posts $31A_o$ and $31A_c$ on the one hand and attachment posts $31A_i$ and $31A_c$ on the other hand being separated by the same distances as Do and Di for attachment to the track pairs 12o/12c, 12i/12c and 14o/14c, 14i,14c, respectively, but may be positioned mirror image to one another, i.e., in a forward facing orientation on the starboard side of the aircraft and a rearward facing orientation on the port side of the aircraft, respectively. This mirror image placement of the passenger seat assemblies $30A_s$ and $30A_p$ is permitted not only by the spacing of the attachment posts $31A_o$, $31A_c$ and $31A_i$ so as to be separated by the distances Do and Di, but also due to the fact that the attachment posts $31A_o$, $31A_c$ and $31A_i$ are asymmetrically off-set relative to the longitudinal centerline planes of the seat assemblies $30A_s$ and $30A_p$ in an outboard direction. As such, the seat assemblies $30A_s$ and $30A_p$ may be positioned closely adjacent to the wall of the aircraft fuselage when fixed to the starboard and port track seat assemblies 12o,12c and 12i or 14o, 14c and 14i, respectively.

It will also be observed in FIGS. 3A and 3B that starboard and port side table assemblies 40s, 40p are positioned in front of the dual passenger seat assemblies $30A_s$, $30A_p$, respectively. The table assemblies 40s, 40p are structurally identical to one another but mirror images when positioned on the starboard and port sides of the fuselage of the aircraft 10. Thus, it will be observed that the table assemblies 40s, 40p are provided with a pair of fixed (non-adjustable) attachment posts $41_o$ and $41_c$ on the one hand and attachment posts $41_i$ and $41_c$ on the other hand for attachment to the pair of rails 12i/12c and 14i/14c, respectively, and that such attachment posts $41_o$ $41_c$ and $41_i$ are asymmetrically oriented in an inboard direction with respect to the longitudinal centerline planes of the tables. In such a manner therefore the tables 40s, 40p may be positioned symmetrically in front of the seat assemblies $30A_s$ and $30A_p$, respectively.

Figure 4A:
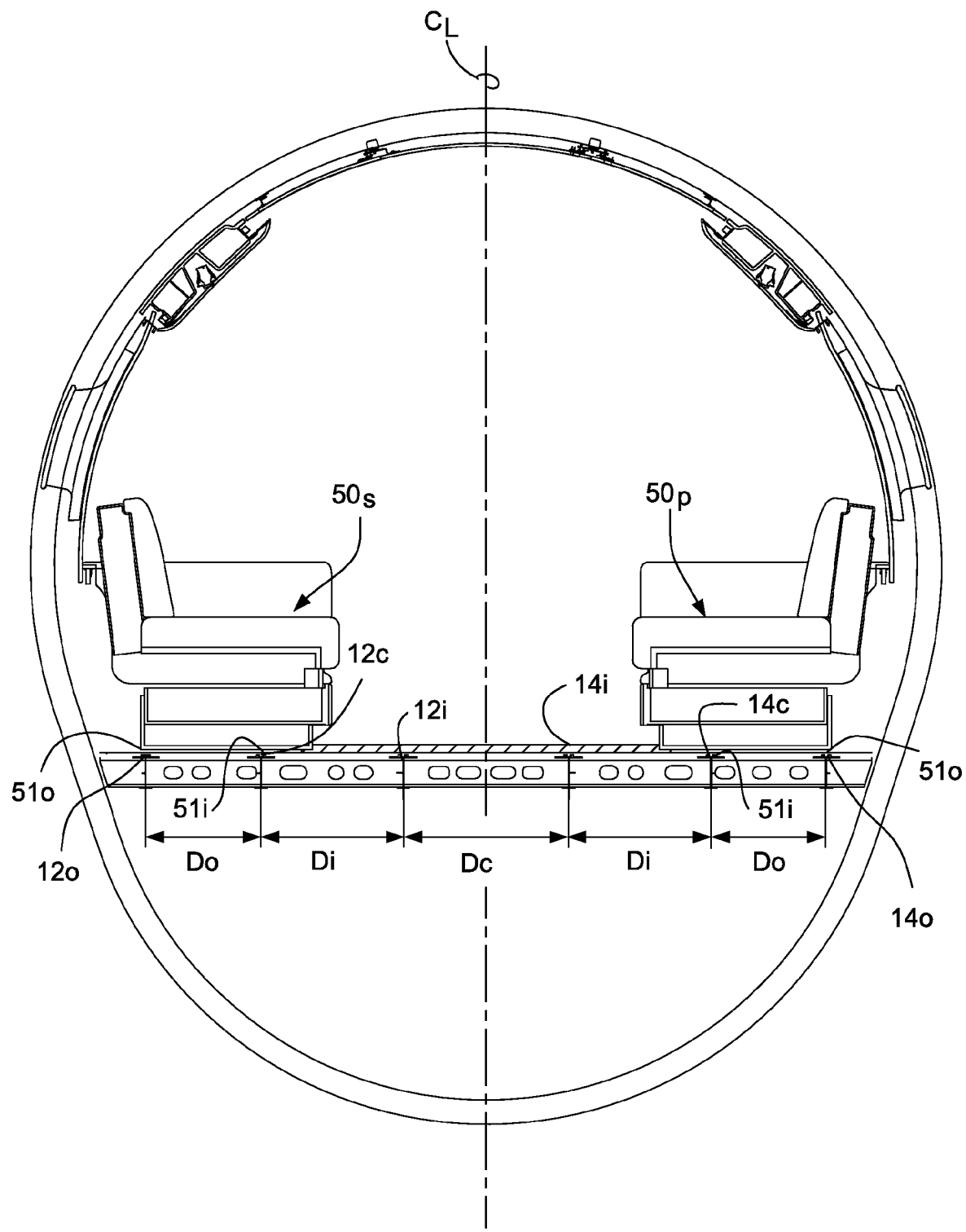
FIGS. 4A and 4B are aftward and forward looking cross-sectional elevations as taken along lines 4A-4A and 4B-4B in FIG. 1B.
Figure 4B:
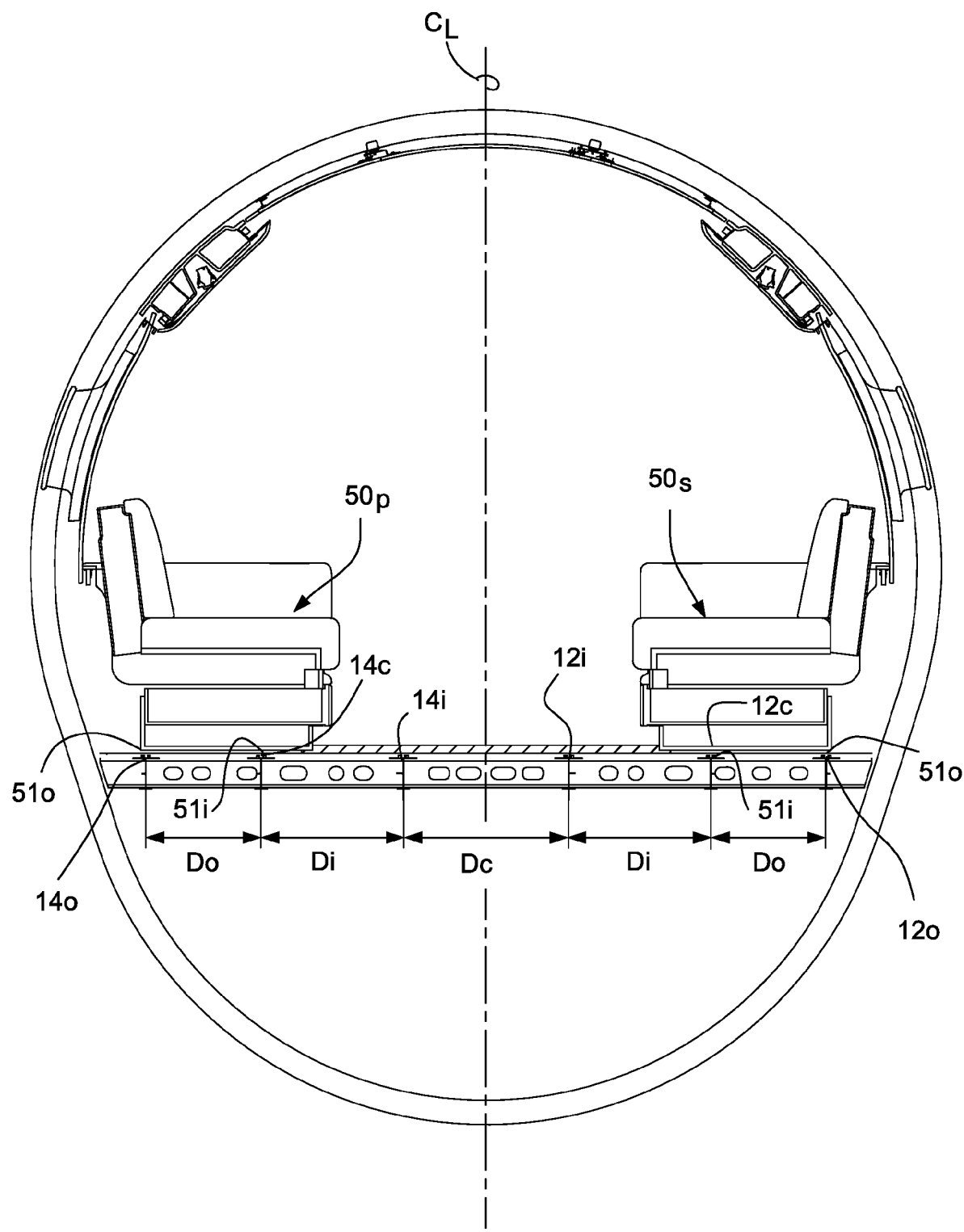

FIGS. 4A and 4B show the placement of starboard and port side sofa assemblies 50s and 50p in the aircraft interior. Specifically, the sofa assemblies 50s and 50p are provided with pairs of fixed (non-adjustable) attachment posts $51_i,51_o$ separated by the distance $D_o$ for attachment to rail pairs $12_o/12_c$ and 14o/14c, respectively. These fixed attachment posts $51_i$, $51_o$ are oriented so as to be asymmetrical with respect to the longitudinal centerline plane of each sofa assembly 50s, 50p so as to be off-set in an outboard direction. As such, the sofa assemblies 50s and 50p may be positioned closely adjacent to the wall of the aircraft fuselage when fixed to the starboard and port track seat assemblies 12o and 12c or 14o and 14c, respectively.

The aircraft interior may also be provided with single seat starboard and port table assemblies 60s, 60p for attachment to the starboard and port rail pairs 12o/12c and 14o/14c, respectively, as shown in FIG. 1B. Like the dual seat table assemblies 40s, 40p discussed previously in connection with FIGS. 3A and 3B, the table assemblies 60s, 60p are structurally identical to one another but mirror images when positioned on the starboard and port sides of the fuselage of the aircraft 10.

Due to the asymmetrical placement of the fixed (non-adjustable) attachment posts provided with the various aircraft interior fixtures (e.g., single passenger seat assemblies, dual passenger seat assemblies, table assemblies, and sofa assemblies), an aircraft's interior may be configured and reconfigured as may be desired. Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Aircraft comprising:
    a fuselage having starboard and port side attachment rails disposed longitudinally parallel to one another, each of the starboard and port side attachment rails consisting of an outboard rail, an inboard rail and a center rail positioned between the inboard and outboard rails; and
    a plurality of interior fixtures attached to predetermined pairs of the starboard and port side attachment rails to provide for a configuration of the fixtures within the fuselage, wherein
    each of the outboard and center rails of the starboard and port side attachment rails is separated by a dimension Do, each of the inboard and center rails of the starboard and port rails is separated by a dimension Di which is greater dimension Do, and each of the inboard rails of the starboard and port rails is separated by a dimension Dc which is greater than the dimension Di, and wherein
    each fixture has fixed attachment posts asymmetrically oriented relative to a longitudinal centerline plane of the fixture and adapted for attachment to the respective predetermined pairs of the starboard and port side attachment rails.

2. Aircraft according to claim 1, wherein the fixtures include at least one selected from the group consisting of single passenger seat assemblies, dual passenger seat assemblies, table assemblies and multiple passenger sofa assemblies.

3. Aircraft according to claim 1, wherein the fixtures include at least one fixture selected from the group consisting of single seat assemblies, dual seat assemblies and multiple passenger sofa assemblies, wherein each of the single seat assemblies, dual seat assemblies and sofa assemblies have fixed attachment posts which are asymmetrically off-set in an outboard direction relative to longitudinal centerline planes thereof.

4. Aircraft according to claim 1 or 3, wherein the fixtures include at least one of single and dual seat assemblies and at least one of single and dual seat table assemblies positioned symmetrically in front of a respective one of the single and dual seat assemblies, wherein each of the single and dual seat table assemblies have fixed attachment posts which are asymmetrically off-set in an inboard direction relative to centerline planes thereof to allow symmetrical positioning in front of the single and dual seat assemblies, respectively.

5. Aircraft according to claim 1 or 3, wherein the fixtures include a multiple passenger sofa assembly having fixed attachment posts which are asymmetrically off-set in an outboard direction relative to a longitudinal centerline plane thereof.

6. A method for configuring an aircraft interior of an aircraft fuselage comprising the steps of:
    providing starboard and port side attachment rails disposed longitudinally parallel to one another within the fuselage, each of the starboard and port side attachment rails consisting of an outboard rail, an inboard rail and a center rail positioned between the inboard and outboard rails such that each of the outboard and center rails of the starboard and port rails is separated by a dimension Do, each of the inboard and center rails of the starboard and port rails is separated by a dimension Di which is greater dimension Do, and each of the inboard rails of the starboard and port rails is separated by a dimension Dc which is greater than the dimension Di;
    providing a plurality of interior fixtures each having fixed attachment posts asymmetrically oriented relative to a longitudinal centerline plane of the fixture; and attaching the fixtures to predetermined pairs of the starboard and port side attachment rails to provide for a selected interior configuration of the fixtures within the fuselage.

7. The method according to claim 6, which comprises providing the fixtures which include at least one selected from the group consisting of single passenger seat assemblies, dual passenger seat assemblies, table assemblies and multiple passenger sofa assemblies.

8. The method according to claim 6, which comprises providing the fixtures which include at least one fixture selected from the group consisting of single seat assemblies, dual seat assemblies and sofa assemblies, wherein each of the single seat assemblies, dual seat assemblies and multiple passenger sofa assemblies have fixed attachment posts which are asymmetrically off-set in an outboard direction relative to longitudinal centerline planes thereof.

9. The method according to claim 6 or 8, which comprises providing the fixtures which include at least one of single and dual seat assemblies and at least one of single and dual seat table assemblies positioned symmetrically in front of a respective one of the single and dual seat assemblies, wherein each of the single and dual seat table assemblies have fixed attachment posts which are asymmetrically off-set in an inboard direction relative to centerline planes thereof to allow symmetrical positioning in front of the single and dual seat assemblies, respectively.

10. The method according to claim 6 or 8, which comprises providing the fixtures which include a multiple passenger sofa assembly having fixed attachment posts which are asymmetrically off-set in an outboard direction relative to a longitudinal centerline plane thereof.

* * * * *